United States Patent
Rosa Brusin et al.

(10) Patent No.: US 11,428,334 B2
(45) Date of Patent: Aug. 30, 2022

(54) BACKFLOW PREVENTION DEVICE WITH REDUCED PRESSURE ZONE

(71) Applicant: Giacomini S.p.A., San Maurizio d'Opaglio (IT)

(72) Inventors: Marco Rosa Brusin, San Maurizio d'Opaglio (IT); Matteo Fantoni, San Maurizio d'Opaglio (IT); Michele Savoini, San Maurizio d'Opaglio (IT); Mauro Bizzo, San Maurizio d'Opaglio (IT)

(73) Assignee: GIACOMINI S.P.A., Novara (IT)

(*) Notice: Subject to any disclaimer, the term of this patent is extended or adjusted under 35 U.S.C. 154(b) by 0 days.

(21) Appl. No.: 17/059,615

(22) PCT Filed: May 27, 2019

(86) PCT No.: PCT/IB2019/054373
§ 371 (c)(1),
(2) Date: Nov. 30, 2020

(87) PCT Pub. No.: WO2019/229626
PCT Pub. Date: Dec. 5, 2019

(65) Prior Publication Data
US 2021/0270377 A1  Sep. 2, 2021

(30) Foreign Application Priority Data
May 30, 2018  (IT) .................. 102018000003819

(51) Int. Cl.
*F16K 11/00* (2006.01)
*F16K 11/10* (2006.01)
*F16K 17/04* (2006.01)

(52) U.S. Cl.
CPC ........ *F16K 11/105* (2013.01); *F16K 17/0453* (2013.01); *F16K 17/0473* (2013.01); *Y10T 137/3331* (2015.04)

(58) Field of Classification Search
CPC ............... Y10T 137/3331; Y10T 137/7895
See application file for complete search history.

(56) References Cited

U.S. PATENT DOCUMENTS

| | | | | |
|---|---|---|---|---|
| 3,171,423 A | * | 3/1965 | Dillon .................... | E03C 1/104 137/218 |
| 3,470,898 A | * | 10/1969 | Langdon ................ | E03C 1/108 137/218 |
| 4,428,392 A | * | 1/1984 | Jones .................. | A61M 16/208 137/102 |

(Continued)

*Primary Examiner* — Robert K Arundale
(74) *Attorney, Agent, or Firm* — Mark Malek; Widerman Malek, PL

(57) ABSTRACT

A backflow prevention device with reduced pressure zone to be installed in water systems is provided and comprises a body provided with inlet, outlet and exhaust openings, a check assembly with a stem, an elastic element, and a plate, a mobile diaphragm or membrane adapted to interrupt the fluid connection between the outlet opening and inlet opening and between said inlet opening and exhaust opening, wherein said stem of said check assembly is stabilized with respect to said body, and said plate is slidably disposed along the stem and is cooperatively placed with the mobile diaphragm or membrane in order to interrupt the fluid connection between said inlet opening and said outlet opening.

14 Claims, 4 Drawing Sheets

(56) References Cited

U.S. PATENT DOCUMENTS

| | | | | |
|---|---|---|---|---|
| 4,669,497 A * | 6/1987 | Tenhengel | ............ | F16K 15/026 |
| | | | | 137/218 |
| 4,821,763 A * | 4/1989 | Ackroyd | ................. | F16L 37/40 |
| | | | | 137/218 |
| 4,984,306 A * | 1/1991 | Sumerix | .................... | E03D 9/02 |
| | | | | 137/218 |
| 5,228,470 A * | 7/1993 | Lair | ........................ | E03C 1/108 |
| | | | | 137/218 |
| 10,378,667 B2 * | 8/2019 | Huang | ................. | F16K 31/1262 |
| 11,072,915 B2 * | 7/2021 | Ball | ........................ | F16K 15/066 |
| 2005/0211299 A1 * | 9/2005 | Tripp | ...................... | E03C 1/106 |
| | | | | 137/218 |
| 2007/0079873 A1 * | 4/2007 | Hecking | ............... | F24D 3/1083 |
| | | | | 137/218 |
| 2016/0178076 A1 * | 6/2016 | Cellemme | ........... | F16K 27/0209 |
| | | | | 137/512 |

* cited by examiner

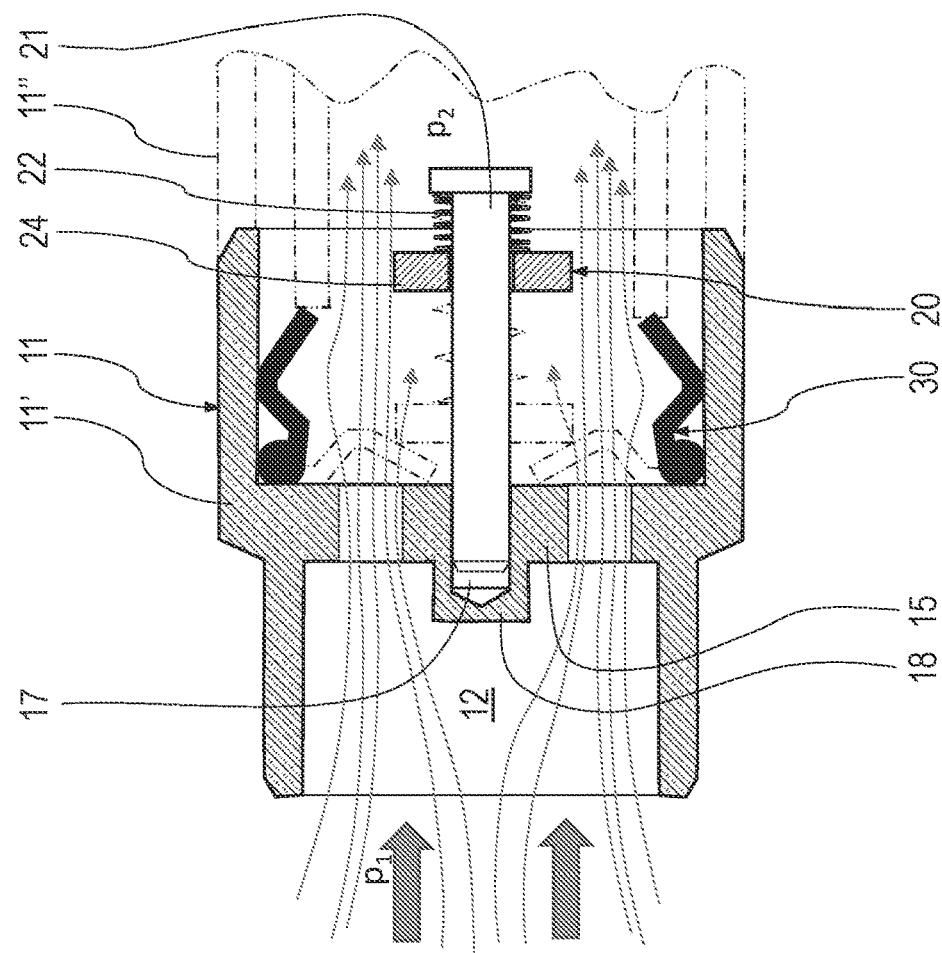
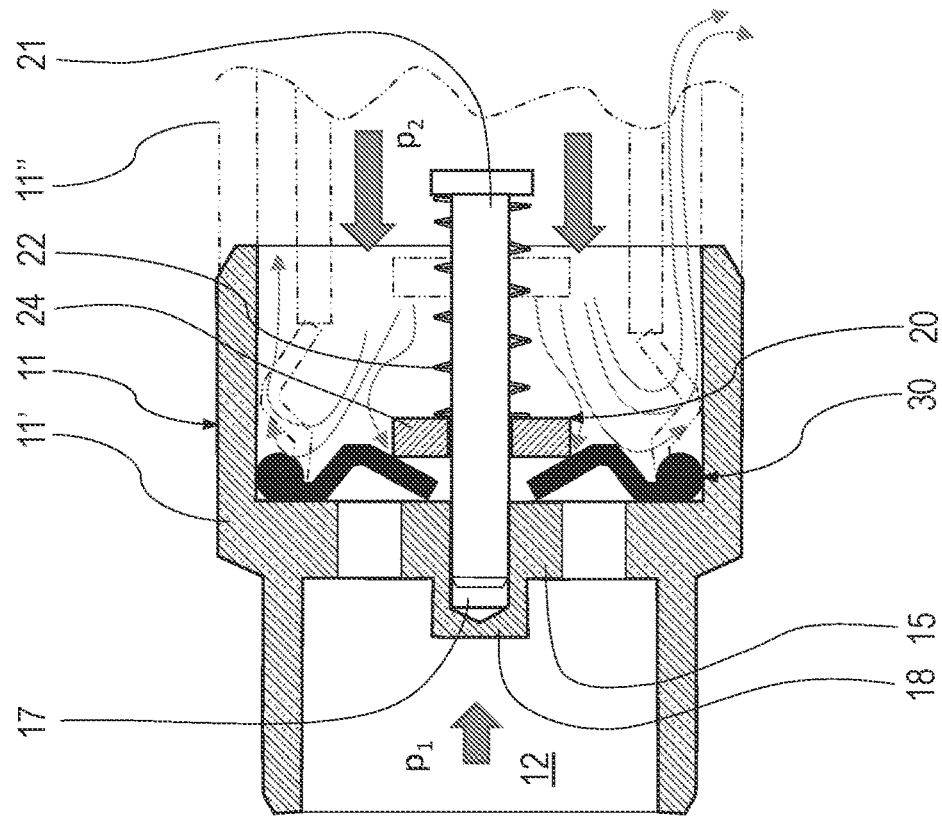

BACKFLOW PREVENTION DEVICE WITH REDUCED PRESSURE ZONE

RELATED APPLICATIONS

This application is a national phase application of and claims priority under 35 U.S.C. § 371 of PCT Application No. PCT/IB2019/054373 filed on May 27, 2019 and titled BACKFLOW PREVENTION DEVICE WITH REDUCED PRESSURE ZONE. The content of this application is incorporated herein by reference.

TECHNICAL FIELD

The present invention refers to a backflow prevention device with reduced pressure zone.

More specifically, the present invention refers to a new technical solution for an uncontrollable, AC-type backflow prevention device, check valve, or backflow preventer with reduced pressure zone, typically, however in a non-limiting way, useable in drinking water supplying systems.

STATE OF THE ART

Anti-pollution backflow prevention devices or check valves, also known as preventers with reduced pressure zone or with zones at different pressures are widely known in the hydraulic and thermotechnical fields.

The preventers with reduced pressure zone or with zones at different pressures are hydraulic protection devices adapted to prevent polluted waters to backflow to a water supply system. Such backflowing fluid, typically water, can be caused by variations and fluctuations of the pressure in the supply system, which are such to cause the fluid to revert its flow direction. Typically, the preventer is installed in the water supply systems between the public waterworks and the user system and defines a separation and safety zone preventing the fluids contained in the two systems to come in contact with each other.

In the public waterworks or drinking water supply systems connected to non-industrial or industrial users of hydraulic and thermohydraulic systems, there are temporary drops of the fluid pressure. When the pressure of the fluid in the public waterworks or water supply system is less than the fluid pressure in the user hydraulic system, the fluid or water of this latter has the tendency to backflow into the public waterworks.

The fluid or water supplied to the hydraulic or thermohydraulic systems of users can come in contact with contaminating, pathogen, or polluting substances which can be dangerous for and can contaminate the water supply system itself where there is a backflow, as for example when a hose of a non-industrial user is connected to a tap and is placed in a dirty water container which, in case of a fluid pressure drop, can withdraw the contaminated fluid into the public waterworks.

In the same way in the industrial hydraulic and thermohydraulic systems, the fluid can come in contact with oils, fuels or harmful, corrosive and/or radioactive substances which, when the fluid backflows into the water supply system, would cause substantial damages.

Consequently, it is easily understandable that in a user water supply systems connected to the public waterworks for distributing the drinking water, it is particularly important to use these backflow prevention devices, which can be also required by regulations in effect in many countries.

The standard preventers with reduced pressure zone, of the type object of the present invention, generally can be controllable or uncontrollable and are implemented by an outer body advantageously divided in two sections, provided with an inlet opening and an outlet opening, typically the interior thereof houses two monostable, serially-arranged check valves and defined by two check assemblies slidingly placed upstream and downstream said openings, in order to enable a fluid to flow in a direction and to prevent it from flowing in the opposite direction. In the zone comprised between the two valves, typically there is an intermediate exhaust or vent opening adapted to discharge the fluid returning from the upstream check assembly and directly towards the supply system into the atmosphere, said exhaust opening being typically opened or closed by a mobile diaphragm or membrane.

During the normal operation, when the fluid pressure is such to overcome the opposing force of the elastic elements of the check valves, the check assemblies of the valves themselves open enabling the fluid to flow only in one direction from the inlet opening, connected to the supply system, towards the outlet opening, connected to the user. The pressure of the moving flow simultaneously acts on the mobile diaphragm or membrane system in order to simultaneously keep closed the exhaust opening.

In the traditional backflow prevention devices or preventers with reduced pressure zone of the type object of the present invention, generally there is a mobile diaphragm or membrane seal disposed in the flow direction of the fluid and traditionally defined by a shaped disc of an elastomeric material having a circular shape with a central hole. The shaped cross-section of said mobile membrane has one or more elbows developing from the central hole towards the outer edge, typically defining a circular link integrally developed on all the circumference.

The operation of the backflow prevention device or preventer with pressure zone can be generally summarized by three conditions:

an operative state under standard or normal conditions, in which the upstream and downstream check assemblies are both open and the exhaust opening is closed by the mobile diaphragm or membrane. During the normal or standard operative condition, the part of the diaphragm in proximity of the central hole opens by elastically deforming under the pressure of the fluid in the flow direction, so that the liquid is linearly conveyed into the central chamber of the valve body and the upstream check assembly is pushed to an open position. Simultaneously, the deformed portion of the diaphragm, in the greatest amount opening condition, tightly obstructs the toroidally shaped outer exhaust chamber made outside and coaxially with the sliding central chamber, so that the fluid is prevented from outflowing towards the exhaust. Increasing the pressure of the fluid entering the intermediate zone opens the check assembly of the valve downstream the preventer under the fluid pressure enabling the fluid to flow through the outlet opening.

stationary flow or no-flow operative state, in which the upstream and downstream check assemblies are held in a closed position by the spring elastic elements. Under this condition, there is no liquid flow towards the two directions and the mobile diaphragm or membrane does not close the fluid passage towards the toroidal outer chamber connected to the outlet opening.

Operative state in the presence of a backflow from the downstream outlet opening, in which the check assemblies are held in a closed position by the spring elastic elements and the pressure of the liquid trying to flow in the opposite direction. However, the upstream check assembly operates only if there is an incomplete or partial closure of the downstream check assembly, this condition is typical and can occur often when this types of devices are used, and is generally caused by solid materials, as debris or dirtiness from the user.

The closing upstream check assembly thrusts, against the valve body, the diaphragm portion in proximity of the central hole, by means of the plate of the check assembly which is held compressed on the mobile diaphragm or membrane itself, in order to stop the return flow from the partially closed downstream check assembly, towards the inlet opening. The mobile diaphragm or membrane disposed in a closed position, together with the upstream check assembly, opens the return flow passage in the outer chamber towards the fluid exhaust opening placed in the intermediate zone between the two check assemblies.

An example of these known backflow prevention devices, of the preventer with reduced pressure zone type, is described in the Chinese utility patent CN 201787144 U which refers to a device with a double check valve comprising an outer valve body and an inner part, wherein the valve body is provided with a seat; while the inner part of the valve is movably disposed in the valve body; the valve seat is provided with a water inlet and outlet and with an outlet at the ends. The mobile inner part of the valve comprises a first valve part disposed at the water inlet, and a second valve part disposed at the outlet. The body of said check valve is provided with an exhaust port; when the first inner part of the valve opens the water inlet, the exhaust port is closed and when the first inner part of the valve closes the water inlet, the discharge port is opened. The second inner part of the valve opens or closes the water outlet by moving with respect to the valve seat. In the cited utility patent, the valve body is internally provided with two inner parts, the second check valve prevents the fluid backflow from entering through the outlet of the valve and is exhausted directly from the exhaust port instead of flowing again through the inlet in order to prevent the pollution.

A further example of these known types of backflow prevention devices, of the preventer with reduced pressure zone type, is described in the international patent application WO 2016/105583 which refers to a backflow prevention device comprising a body with an inlet and outlet and adapted to be installed in order to have a fluid connection in a liquid supply system. An upstream check plate assembly is positioned in the body downstream the inlet and comprises an upstream control plate supporting a downstream diaphragm. A second upstream check assembly is positioned downstream the diaphragm and is integrally formed with an upstream stem and is disposed in an opening made in a central hub formed in the body in order to move between a normally open flow position and a closed position preventing the liquid from backflowing through the inlet. A downstream plate assembly is positioned in the housing downstream the upstream control plate assembly. A vent discharges the backflow liquid in the atmosphere upstream the downstream check plate assembly.

Said known backflow prevention devices or preventers with reduced pressure zone, or with zones at different pressures, however, have disadvantages and operative limits.

In the cited backflow prevention devices present in the state of the art, the check assemblies defining the check valves are generally and advantageously formed, for the sake of the simplicity and cost-effectiveness, by a disc-shaped plate bored in the central part and stabilized integrally with the end of a cylindrical stem or shaft typically by plastically deforming the metal of said stem, e.g. by heading or damping the metal of the stem end.

Referring firstly to FIGS. 4 and 5, the process of assembling the check assembly, which can generally comprise also a flat seal having a perforated circular shape and disposed on the abutment face of the plate, has a typical shortcoming of these devices, because while is capable of mechanically stabilizing the plate to the stem, unfortunately it does not provide any fluid tightness between said stem and said plate and does not eliminate the possibility of seepages or leakages of the fluid F between the same, as illustrated in FIG. 4. In backflow conditions of the contaminated fluid, therefore, a small quantity of fluid can leakage between the mechanical coupling surfaces defined between the plate hole and the free end of the stem of said check assembly and can leakage between the coupling surfaces of the stem and central hole of the hub made in the body, with respect to this the check assembly being slidingly disposed. In order to enable the stem of said check assembly to freely slide, the coupling between said stem and said central hole of the hub must inevitably have a free space or a mechanical clearance, unfortunately the contaminated fluid can leakage through it upstream the device and can contaminate the waterworks, particularly if the coupling surfaces slidingly in contact with each other are substantially worn.

The mechanical clearance between the stem and the hub central hole, besides causing a leakage between the coupling surfaces, causes a further inconvenience and operative limit typical of this known backflow prevention devices, said mechanical clearance being subjected to worsen due to the use and operative wear.

In standard operative conditions, indeed, the check assembly embodies a fluid dynamic obstruction to the fluid flow. This obstruction generates turbulences T in the stationary laminar flow of the fluid such to generate angular oscillations and vibrations of the check assembly in a direction generally radial to the fluid motion, as shown in FIG. 5 by a double dotted broken line. These angular oscillations and vibrations are greater at the plate and they are the wider the more open the check is and consequently the greater the flow is, so that the turbulences of the fluid motion are increased and an increase of the flow resistances, efficiency of the valve is determined, and also cavitation phenomena and anticipated wear of the components of the backflow prevention device are caused.

Another disadvantage of these known backflow prevention devices occurs during the step of closing the upstream valve because the plate of the check assembly contacts the mobile diaphragm or membrane by an edge contact consequently by a small surface and an uneven and not constant pressure, all this causes an incomplete and not centered buckling of the portion adjacent the central hole of the diaphragm itself against the valve body. Moreover, this condition could be worsened by the transversal oscillations and vibrations of the check assembly so that the check assembly plate is substantially offset from the central hole of the diaphragm or membrane, determining a less-than-perfect fluid tight closure and contributing to an anticipated wear of the elastomeric material of the diaphragm and disc-shaped seal of the plate.

Another disadvantage is that the swirling fluid motion can also be such to unevenly warp the mobile diaphragm or membrane consequently promoting its wear or an anticipated downtime of the device besides a substantial decrease of the fluid dynamic efficiency of the backflow prevention device.

OBJECTS OF THE INVENTION

The object of the present invention consists of at least partially overcoming and preventing the above-cited operative inconveniences and limits.

More particularly, the object of the present invention consists of providing a backflow prevention device with reduced pressure zone, adapted to ensure an increased safety of the systems and a better tightness against the polluting fluids.

A further object of the present invention consists of making available to the user a backflow prevention device with a reduced pressure zone having a higher efficiency and a better flow uniformity, without hydrodynamic turbulences and cavitation phenomenons.

A still further object of the present invention consists of providing a backflow prevention device with reduced pressure zone capable of ensuring a high resistance and reliability over time, so that to be in addition easily and cost-effectively manufacturable.

These and other objects are met by the backflow prevention device with reduced pressure zone object of the present invention according to the independent claim.

The constructive and operative characteristics of the backflow prevention device with reduced pressure zone could be better understood from the following detailed description, in which it is made reference to the attached drawings representing some preferred nonlimiting embodiments, in which:

BRIEF DESCRIPTION OF THE FIGURES

FIG. 2 is a schematic and partial representation of a longitudinal cross-section view of the operation of the backflow prevention device with reduced pressure zone object of the present invention, under the counterpressure and backflow condition of the fluid from the downstream check assembly (not shown) and with the upstream check assembly in the closed position;

FIG. 3 is a schematic partial representation of a longitudinal cross-section view of the operation of the backflow prevention device with reduced pressure zone object of the present invention, under the standard operative condition having the flow moving towards the downstream check assembly (not shown) and with the upstream check assembly in the greatest opening limit position;

DETAILED DESCRIPTION OF THE INVENTION

Figures from 1 to 3 describe a preferred embodiment of the backflow prevention device with reduced pressure zone 10 object of the present invention.

Figure 1:
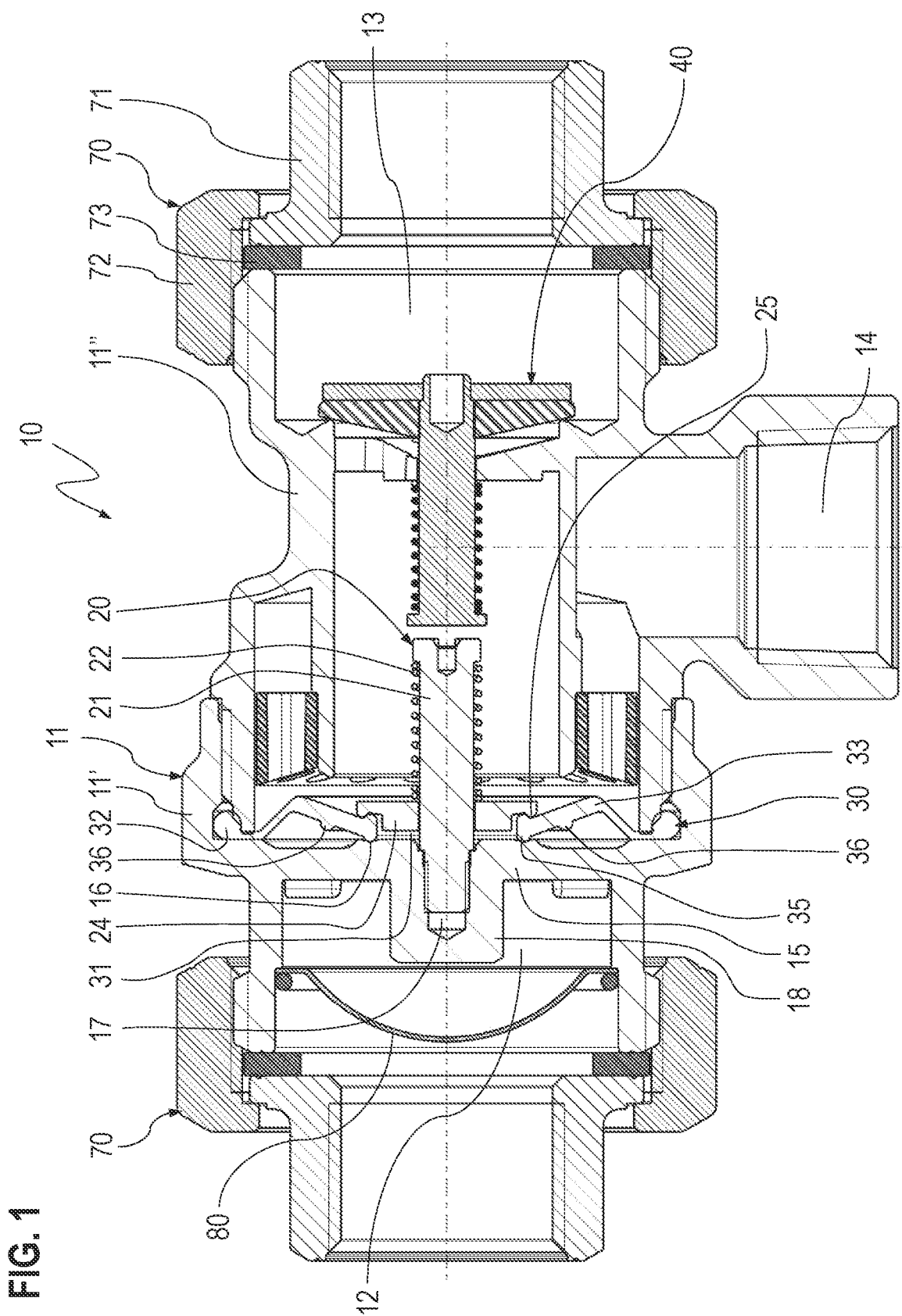
FIG. 1 is a schematic representation of a longitudinal cross-section view of a preferred embodiment of the backflow prevention device with reduced pressure zone object of the present invention.

Particularly, it is made reference to FIG. 1, which shows a backflow prevention device with reduced pressure zone 10, or with zones at different pressures, suitable for or configured to be installed in water supply systems, comprising:

a internally hollow body 11 traditionally made of a metal material adapted to hydraulic applications, such as for example brass, generally divided, for the sake of assembly simplicity, in an upstream portion 11 and in a downstream portion 11' separable from each other, said body 11 being provided with a fluid inlet opening 12 from the water system, a fluid outlet opening 13 towards the user and a backflow fluid exhaust opening 14 from the user;

at least a check valve assembly 20, typically an upstream check assembly and a second downstream check assembly 40, said check assembly 20 being a check valve, and comprising a stem 21 generally made of a metal material, a coil spring type elastic element 22, and a plate 24 generally having a perforated disc shape, said check assembly 20 being housed in said body 11 and adapted to interrupt the upstream fluid connection between said inlet opening 12 and said outlet opening 13 of the body 11.

Further, said backflow prevention device 10 comprises:

a deformable mobile diaphragm or membrane 30 made of an elastomeric material and having an operatively disc-shaped form with a central opening 31, an outer diametral portion 32 and an elbow radial section 33, said mobile diaphragm or membrane 30 being disposed in the flow direction in the body 11 and being adapted to interrupt, in a closed position, the fluid connection between the outlet opening 13 and inlet opening 12; and, in an open position, to interrupt the fluid connection between said inlet opening 12 and exhaust opening 14.

Referring only to FIG. 1, the backflow prevention device 10 is preferably sold with, and generally comprises also standard-type connectors 70 provided with known mobile fixing means at the inlet 12 and outlet openings 13 and adapted to a fluid connection with the standard hydraulic systems, said connectors 70 typically can comprise a flanged bush 71, a nut 72, and a seal 73. Moreover, the device 10 can be advantageously provided with a filter 80 disposed in the upstream portion 11' of the body 11 and adapted to prevent solid particles to flow through the inlet opening 12.

Still referring to the cited Figures, the main novel characteristic of the backflow prevention device 10 is embodied by the fact that said stem 21 of the check assembly 20 is fixedly stabilized and integral with said body 11 and by the fact said plate 24 is slidingly disposed along said stem 21 and is cooperatively placed in surface contact with said mobile diaphragm or membrane 30, in such a way to interrupting, in a closed position, the fluid connection between said inlet opening 12 and said outlet opening 13 of the body 11.

Referring again to the same Figures, moreover the stem 21 can also be inserted and stabilized by an end thereof, with known fixing means, in a hole of the hub 17 made in a central portion 18 defining an appendage formed in the central part of the perforated partition 15 of said body 11. Said known fixing means can be mobile, such as threads or similar means or can be fixed as interference fits, welds and similar. In an alternative embodiment (not shown), said stem can be also integrally made with the same body 11.

The central portion 18, in which said hub hole 17 is made, being formed on said perforated partition 15 of the upstream portion 11' of the body 11, can advantageously project in a flow direction towards said inlet opening 12 of said body 11, in order to enable to obtain a sufficient longitudinal development of the hole 17 itself of the hub, which preferably is a blind hole, however can be also a through hole crossing all the perforated partition 15.

Advantageously, said hub hole 17 can be threaded and adapted to be screwed to a corresponding threading formed on an end of said stem 21, and in case of a through embodiment of the hub hole 17, the threading can be advantageously fluid tight, such as for example a cylindrical or conical GAS or BSP type threading tight sealed on the thread.

A further novel characteristic (not shown) is given by the fact that the free end of said central portion 18 facing the inlet opening 12 can have a hydrodynamic shape developing towards the same inlet opening 12, such as for example a pin or nosecone shape.

By particularly referring only to FIG. 1, also the diaphragm or membrane 30 and plate 24 of the check assembly 20 can advantageously be provided with features adapted to improve the seal efficiency and safety of the backflow prevention device 10.

Particularly, a tooth 35 or projection can be advantageously formed on said mobile diaphragm or membrane 30, which defines a lobed-section profile having a complete annular development, with an increased thickness with respect to the cross-section thickness of the mobile diaphragm or membrane 30, said tooth 35 being disposed in proximity of said central opening 31 of said mobile diaphragm or membrane 30 and being adapted to cooperate, under fluid-tight conditions, with said check assembly 20 and body 11. Said annular lobed-section with an increased thickness defining said tooth 35 is preferably developed on both sides or faces, however it can also project towards only a side or can define several thicknesses between the two faces or sides of said diaphragm or membrane 30.

Still referring to the preferred embodiment of FIG. 1, the tooth 35 can be advantageously adapted to be arranged, in a fluid-tight cooperation, in a first annular recess 16 conjugated to the same tooth 35, said annular recess 16 being made in the central portion of a perforated partition 15 of the body 11 outside the central hub hole 17 in which slides the stem 21.

Particularly, referring again to FIG. 1, said tooth 35 of the mobile diaphragm or membrane 30 can be also advantageously adapted to be disposed, with a fluid-tightness cooperation, in a second conjugated annular recess 25 made in the outer diametral portion of the plate 24 of the check assembly 20, in order to form a diametral projection in the axial flow direction.

In a further simplified embodiment (not shown), said tooth 35 can be adapted to be disposed, in a fluid-tightness cooperation, with a further standard sealing element, typically of an elastomeric material, coaxially to and in contact with a face of a standard not-shaped plate 24. Indeed, said tooth 35 can be advantageously made of a harder elastomeric material and adapted to deform and penetrate a contact surface of said standard sealing element in order to improve the fluid-tightness.

Referring again to FIG. 1, said diaphragm or membrane 30 can be also provided with at least one rib 36 formed in said elbow radial section 33 in the portion comprised between said central opening 31 and the outer diametral edge 32, said rib 36 being adapted to improve the elastic deformability of said mobile diaphragm or membrane 30 in the presence of dishomogeneous deformations caused by fluid turbulences. Preferably, the rib is formed in said elbow radial section 33 between said central opening 31 and the elbow itself of said diaphragm or membrane 30 and has a transversal section with a substantially semicircular shape or shaped in another way as a function of the required elastic rigidity.

In a further possible alternative embodiment, not shown, said rib 36 can also extend or project on both the faces of said mobile diaphragm or membrane 30 with a substantially circular shaped transversal section.

The description of the backflow prevention device 10 with a reduced pressure zone, object of the present invention, enables to understand the operation described in the following.

Referring particularly also to FIGS. 2 and 3, the backflow prevention device 10 with reduced pressure zone object of the present invention is an advantageous technical solution with respect to the standard backflow prevention devices with reduced pressure zone or zones at different pressures of the prior art.

In the presence of a counter pressure condition of a fluid returning from an user, schematically shown in FIG. 2, both the upstream 20 and downstream check assemblies 40 (not shown), are actuated in a closed position by the return fluid pressure and by the force exerted by the elastic elements 22.

Referring again to FIG. 2, when the downstream check assembly 40 is prevented from being closed in a tightness condition due to impurities, debris and other waste, the fluid returning from the user flows again in the intermediate zone between the two check assemblies 20 and 40. In this case, only the plate 24 of the upstream check assembly 20 moves towards the closed position by coming in contact with the mobile diaphragm or membrane 30 in order to prevent the fluid to flow upstream, towards the inlet opening 21, while the stem 21 remains fixed with respect to the body 11.

Figure 5:
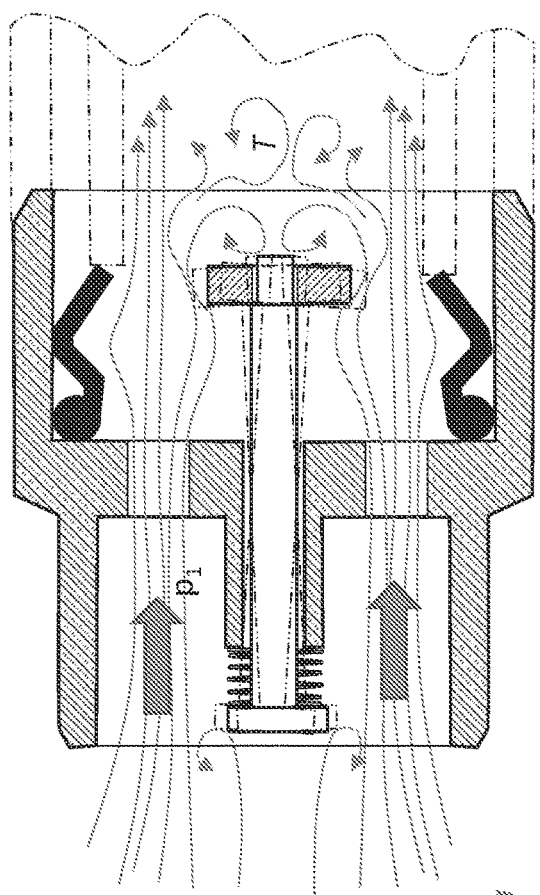
FIG. 5 is a schematic partial representation of a longitudinal cross-section view of a backflow prevention device with reduced pressure zone according to the prior art in the standard operative condition when the fluid flows towards the downstream check assembly (not shown) and with the presence of hydrodynamic turbulence phenomena caused by the transversal oscillations and vibrations of the upstream check assembly placed in the greatest opening limit position.
Figure 4:
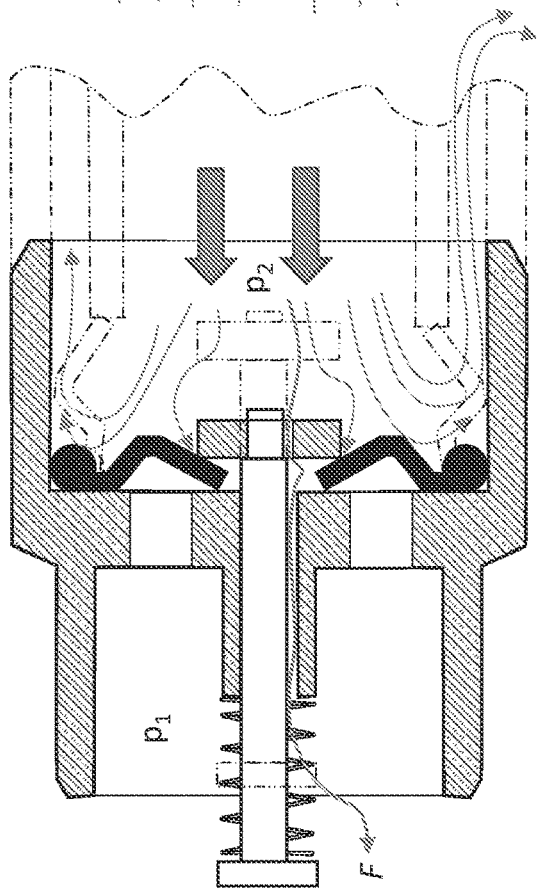
FIG. 4 is a schematic partial representation of a longitudinal cross-section view of a backflow prevention device with reduced pressure zone according to the prior art, under the counterpressure and backflow condition of the fluid from the downstream check assembly (not shown) and under a leakage condition of the contaminated fluid through the upstream check assembly in the closed position.
Figure 6:
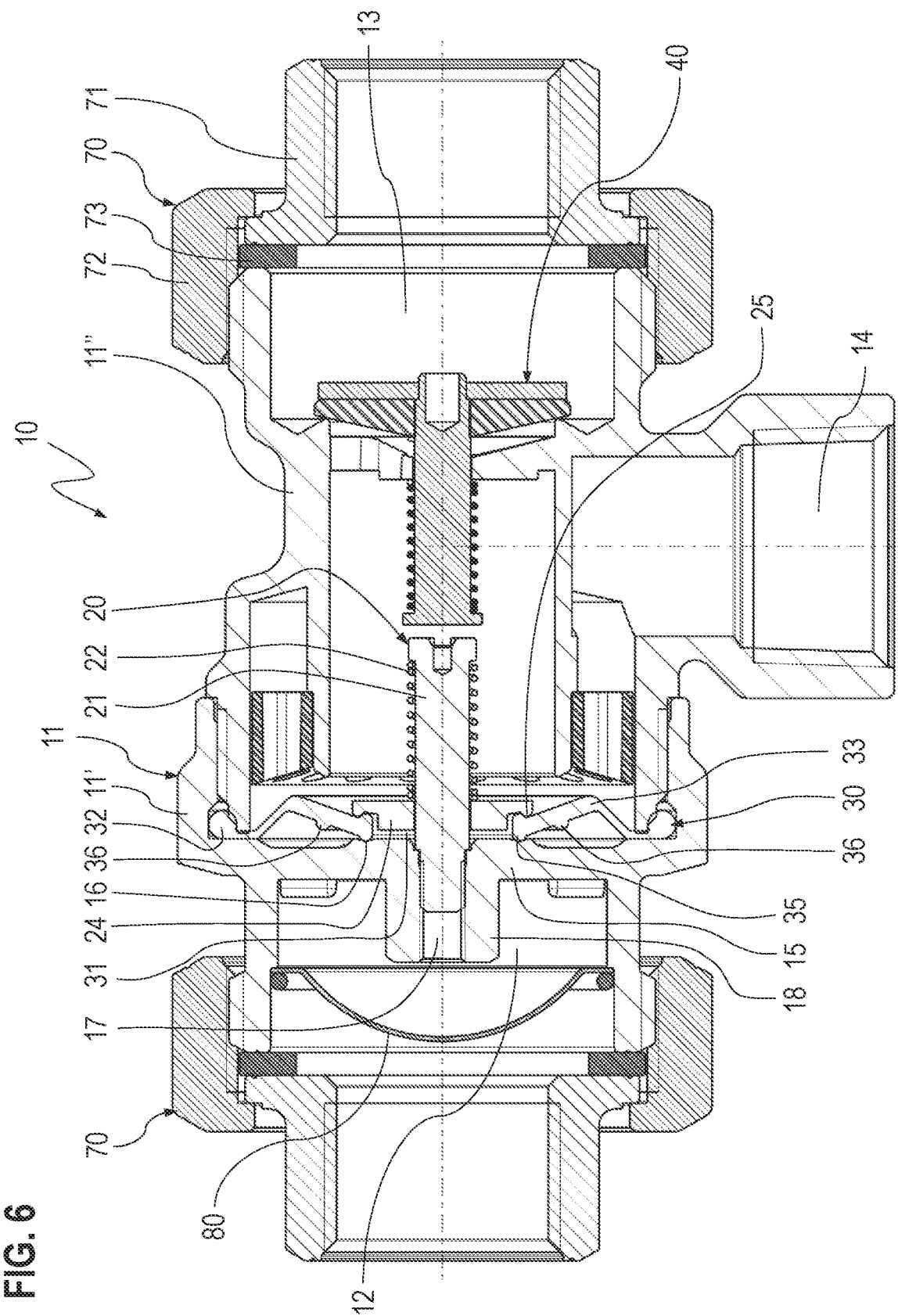
FIG. 6 is a schematic representation of a longitudinal cross-section view of another embodiment of the backflow prevention device with reduced pressure zone object of the present invention.

Referring particularly to FIG. 3, in the fluid passage condition when the check 20 is open, the transversal clearance of the plate 24, slidingly disposed on the stem 21, is advantageously held constant and contained and does not increase as the opening stroke of the check assembly 20 increases due to an increase of the fluid flow, so that the same flow is held constant and as much as possible in a laminar state, limiting the generation of turbulences and cavitation phenomena, as opposed to a standard device as illustrated in FIG. 5.

Referring particularly again to FIG. 1, the tooth 35 formed on the mobile diaphragm or membrane 30 further enables a better locally distributed contact by the plate 24 preferably pressing on the tooth 35 by buckling it against the central portion of the perforated partition 15 of the body 11, so that a stably and accurate seal is ensured as opposed to the standard backflow prevention devices of the prior art, having an edge contact between the plate and the mobile diaphragm or membrane.

In the preferred embodiment of FIG. 1, advantageously the tooth 35 formed on the diaphragm or membrane is further made to cooperate also with the first annular recess 16 made in the central part of the perforated partition 15 of the body 11, in order to increase the sealing contact surface and also the centering of the central portion of the mobile diaphragm or membrane 30 in a closed position. In the same embodiment of FIG. 1, said tooth 35 is further made to cooperate with the second conjugated annular recess 25, which, by forming a further outer toothed profile on the flat surface of the plate 24, causes, besides an increase of the contact sealing surface, a self-centering of the plate 24 with respect to the mobile diaphragm or membrane 30, also when the plate 24 is not perfectly coaxial with the central opening 31 of the mobile diaphragm or membrane 30, due to clearances or oscillations of the check assembly 20, enabling a better and efficient tightness between the plate 24, mobile diaphragm or membrane 30 and body 11 of the backflow prevention device 10.

In the alternative simplified embodiment (not shown), the check assembly 20 with a known type flat plate 24 provided with a further known flat sealing element, presses the tooth 35 of said mobile diaphragm or membrane 30 by the same sealing element 50 which, by deforming and adapting to the tooth 35 itself, provides the compression of the same on the body 11 and a greater contact surface for improving the tightness.

Referring again to FIG. 1, the rib 36 formed on said diaphragm or membrane 30 at said elbow radial section 33, provides a more uniform and proportional deformation of the diaphragm itself both in a closed condition and in a normal operative condition as the fluid flows. Indeed, the rib 36 prevents an uneven irregular deformation of the central opening 31 of the mobile diaphragm or membrane 30 itself also in the presence of flow turbulences, enabling a better operation and a longer life of the diaphragm itself both in an open condition and in a closed condition. The size and thickness of the rib, and also the development thereof on one or both sides of said mobile diaphragm or membrane 30, can change as a function of the supply pressure at which the backflow prevention device 10 is subjected, in order to change the elastic rigidity of the mobile diaphragm or membrane itself.

The absence of a through hole in which the stem 21 slides or the presence of a tight threading in the hub hole 17 ensure to seal off the contaminated fluid between the fixed coupling surfaces between the stem 21 and body 11 without requiring further fluid sealing elements.

As it is understood from before, the advantages which the backflow prevention device 10 with reduced pressure zone object of the present invention obtains, are evident.

The backflow prevention device 10 with reduced pressure zone object of the present invention is particularly advantageous since enables to provide an user a backflow prevention device having a better and increased tightness against polluting fluids in backflow conditions of the fluid from the user, and a greater safety in the water supply systems.

The backflow prevention device 10 with reduced pressure zone object of the present invention is further particularly advantageous since enables to provide the user a backflow prevention device with a better fluid dynamic efficiency.

Still another advantage of the backflow prevention device 10 with reduced pressure zone is the provision of a backflow prevention device having a greater operative life and an increased resistance to wear.

Even though the invention has been hereinbefore described referring particularly to a preferred embodiment given in an exemplifying and non-limiting way, several changes and variants will be apparent to a person skilled in the art by considering the above discussed description. Therefore, the present invention intends to encompass all the modifications and variants falling into the scope of the following claims.

The invention claimed is:

1. A backflow prevention device to be installed on hydraulic systems comprising:
    an internally hollow body provided with an inlet opening, an outlet opening and an exhaust opening;
    at least one check assembly, comprising a stem, an elastic element and a plate, said check assembly being housed in said body;
    a deformable mobile diaphragm having a disc-shaped form with a central opening and an elbow radial section, said mobile diaphragm being arranged in the flow direction within the body and suitable for interrupting the fluid connection between the outlet opening and the inlet opening and between said inlet opening and the exhaust opening;
    wherein said stem of said check assembly is stabilized and integral with respect to said body; and wherein said plate is slidably arranged along said stem and cooperatively placed in surface contact with said mobile diaphragm in such a way to interrupting the fluid connection between said inlet opening and said outlet opening of the body.

2. The backflow prevention device according to claim 1, wherein said stem is inserted and stabilized at one end in a hole formed in a central portion of a perforated partition of said body.

3. The backflow prevention device according to claim 2, wherein said central portion of said perforated partition projects in a flow direction towards said inlet opening of said body.

4. The backflow prevention device according to claim 2, wherein said hole is a blind hole.

5. The backflow prevention device according to claim 2, wherein said hole is a through hole.

6. The backflow prevention device according to claim 2, wherein said hole is a threaded hole.

7. The backflow prevention device according to claim 6, wherein said hole is a watertight threaded hole.

8. The backflow prevention device according to claim 3, wherein a free end of said central portion has a hydrodynamic shape which develops in the direction of said inlet opening.

9. The backflow prevention device according to claim 1, wherein a tooth is formed on said mobile diaphragm, which develops on both sides of said diaphragm.

10. The backflow prevention device according to claim 1, wherein on said mobile diaphragm a tooth is formed defining a lobed-section profile having an annular development, arranged near said central opening, said tooth being suitable for cooperating under fluid-tight conditions with said check assembly and said body.

11. The backflow prevention device according to claim 10, wherein said lobed section of the tooth develops in the direction of both sides of said mobile diaphragm.

12. The backflow prevention device according to claim 11, wherein said tooth is suitable for arranging in fluid-tight cooperation in a first conjugated annular recess, formed in the central portion of a perforated partition of the body.

13. The backflow prevention device according to claim 11, wherein said tooth is suitable for arranging in fluid-tight cooperation in a second conjugated annular recess, formed on the outer diametral portion of the plate of the check assembly.

14. The backflow prevention device according to claim 1, wherein said diaphragm is provided with at least one rib formed on said elbow radial section between said central opening and the outer diametral edge, said rib being suitable for improving the elastic deformability of said mobile diaphragm in the presence of fluid turbulence.

* * * * *